United States Patent [19]

Schmidt

[11] Patent Number: 4,770,392
[45] Date of Patent: Sep. 13, 1988

[54] SHUT-OFF DEVICE FOR PIPES

[76] Inventor: Fritz Schmidt, Im Höltken 13, 4270 Dorsten, Fed. Rep. of Germany

[21] Appl. No.: 23,551
[22] PCT Filed: May 27, 1986
[86] PCT No.: PCT/DE86/00216
  § 371 Date: Jan. 30, 1987
  § 102(e) Date: Jan. 30, 1987
[87] PCT Pub. No.: WO86/07122
  PCT Pub. Date: Dec. 4, 1986

[30] Foreign Application Priority Data

May 30, 1985 [DE] Fed. Rep. of Germany ....... 3519375
Oct. 5, 1985 [DE] Fed. Rep. of Germany ....... 3535637
Feb. 28, 1986 [DE] Fed. Rep. of Germany ....... 3606509

[51] Int. Cl.⁴ ............... F16K 25/00; F16K 1/22; F16K 31/524; F16K 31/53
[52] U.S. Cl. .................. 251/158; 251/177; 251/215; 251/227; 251/229; 251/250; 251/251; 251/263; 251/303; 251/308
[58] Field of Search ............ 251/56, 85, 160, 162, 251/163, 228, 229, 250, 251, 299, 298, 305, 308, 177, 215, 227, 263, 303

[56] References Cited

U.S. PATENT DOCUMENTS

| 2,934,310 | 4/1960 | Kinney et al. | 251/163 |
| 3,065,950 | 11/1962 | Goldberg | 251/160 |
| 3,477,690 | 11/1969 | Murota et al. | 251/163 |
| 3,498,583 | 3/1970 | Friedell | 251/308 |
| 3,583,669 | 6/1971 | Topham et al. | 251/163 |
| 3,780,983 | 12/1973 | Topham et al. | 251/308 |
| 3,804,124 | 4/1974 | Finke et al. | 251/298 |
| 3,857,545 | 12/1974 | Santi | 251/229 |
| 3,963,211 | 6/1976 | Myers | 251/298 |
| 4,280,681 | 7/1981 | Harris | 251/229 |
| 4,586,693 | 5/1986 | Tinner | 251/56 |

FOREIGN PATENT DOCUMENTS

| 1072035 | 12/1959 | Fed. Rep. of Germany | 251/163 |
| 1076456 | 2/1960 | Fed. Rep. of Germany . | |
| 2809604 | 9/1979 | Fed. Rep. of Germany . | |
| 3018101 | 11/1981 | Fed. Rep. of Germany . | |
| 2535432 | 3/1984 | France . | |
| 495477 | 3/1976 | U.S.S.R. | 251/163 |

Primary Examiner—George L. Walton
Attorney, Agent, or Firm—Remy J. VanOphem

[57] ABSTRACT

For a shut-off device comprising a tubular housing to be built into a pipe and a rotary valve for which a driving shaft penetrating the housing and a seat in the housing are provided, a ring wheel (4) with movable bearings (9) being disposed on the driving shaft (10) and the valve flap (3) being guided in the ring wheel (4) and connected with the driving shaft by a gearing (22, 23) which locks when the valve flap (3) swivels in and serves to press the valve flap (3) onto its seat (32), the invention provides for the following: when the driving shaft (10) is rotated back, the gearing (22, 23) lifts the valve flap (3) axially off the seat (32) until the valve flap (3) is supported on the ring wheel (4), and the gearing (22, 23) constitutes the connection between the valve flap (3) and the driving shaft, the valve flap (3) being supported on the ring wheel (4).

39 Claims, 18 Drawing Sheets

SHUT-OFF DEVICE FOR PIPES

BACKGROUND OF THE INVENTION

1. Field of the Invention

The present invention relates to a shut-off device for pipes according to the introductory part of claim 1.

2. Description of the Prior Art

The inventive shut-off device differs from a simple valve flap which constitutes a double lever with respect to the driving shaft and swivels on the seat on the housing side with each flap half from different sides regarded in the axial direction. This known valve flap necessitates a spherical contour of the sealing surfaces on the flap and housing sides, which must therefore be precisely fitted to each other. The tight flap seat must have a press fit between the valve flap and its seat on the housing side due to the pressure differences in the tubular housing. When the valve flap is opened or closed this necessitates a high driving torque. Due to the friction between the valve flap and the housing there is very great wear on the sealing surfaces in particular in the case of abrasive flow media. This wear initially causes a reduction of imperviousness. Therefore, the entire shut-off device must be frequently replaced.

In the inventive shut-off device, however, the sealing effect is maintained for long periods of time and in spite of frequent operation. There is also a small driving torque when the flap is opened and closed.

SUMMARY OF THE INVENTION

The point of departure for the invention is a known shutoff device (German Offenlegungsschrift No. 31 43 843). In this device, the valve flap can be swivelled out of the flow position completely into a position perpendicular to the axis of flow at first without touching the housing, so that the driving torque must only overcome the flow forces of the flow medium.

The valve flap is pressed onto the housing seat by a set of gears which acts only in one direction and therefore onesidedly between the driving shaft and the valve flap. This avoids frictional stress on its edges. However, it is disadvantageous that the ring wheel mounted loosely on the driving shaft must be pressed off the valve flap by disk springs in order to ensure the engagement of a gear cam on the driving shaft when the ring wheel and the valve flap are jointly swivelled onto the housing seat, or to ensure a ring wheel stop fixed on the housing. For, on the one hand, this makes it much more difficult for the axial movement of the valve flap toward the housing seat to be initiated due to the high frictional forces of the gearing. On the other hand, the valve flap can be lifted from its housing seat only by the force of the disk springs which are compressed in the process, after the gear cam has released the valve flap due to the driving shaft being rotated back. If the high shutting pressure of the shut-off device acts on the same side of the valve flap, the spring force, which cannot be increased at will, generally does not suffice to lift it.

The invention is based on the problem of providing a valve flap capable of being lifted off its seat independently of the direction of the pressure in the pipe acting on the valve plate located in the shutting position, in the shut-off device assumed as being known, which runs smoothly during swivelling and during the axial movement of the valve flap.

This problem is solved by the invention with the features of claim 1. Expedient embodiments of the invention are the object of the subclaims.

According to the invention, the gearing built in between the driving shaft and the valve flap acts compulsorily in both axial directions. Consequently, no springs are required to lift the valve flap off the seat fixed on the housing. This gearing constitutes the only connection between the valve flap and the driving shaft according to the invention. This makes it possible to give the gearing a smooth-running design because the forces which hold the ring wheel and the valve flap together during swivelling are not transmitted via the gearing elements. For jointly swivelling the ring wheel and the valve flap the forces of a self-locking gearing generally suffice to prevent the ring wheel and the valve flap from separating. Since these two components are mutually supported, the valve flap need no longer be mounted on the shaft.

The invention is advantageous in that the valve flap can follow a relatively long axial path, which is due to its direct connection with the gearing and the fact that it is furthermore no longer connected with the driving shaft. The axial movement is therefore straight as well. Consequently, the valve flap is no longer swivelled into the seat but rather pressed onto it. Simple seat surfaces can therefore replace conical or tapered sealing surfaces. The wear of the sealing surfaces is therefore considerably reduced. Phenomena of wear which occur after long periods of operation can be compensated by a slight additional axial movement of the valve flap.

The construction of the inventive shut-off device according to claim 2 results in the open position in an overall arrangement of the ring wheel and valve flap which is particularly favorable to flow. The central arrangement of the flap projection requires only small closing forces.

In the embodiment according to claim 3, there is a relatively simple construction of the gearing of two parts which tilt together.

The invention provides in its embodiment according to claim 4 for the guide flange to assume not only a guide function but also a sealing function, so that matter suspended in the flow medium cannot penetrate the gap between the guide member and the flap and thus cannot obstruct the withdrawal of the flap from the housing seat.

In the embodiment of the invention according to claim 5, the cohesion of the ring wheel and the valve flap which comes about automatically in the conventional flap arrangement with a horizontal driving shaft disposed doubly eccentric to the flap is ensured during the swivelling movement with pull-back springs by the effect of gravity. Thus, no accidental separation can come about in this phase, for example by pressure surges in the flow medium. The arrangement of pull-back springs also allows for the shut-off device to be built in with any desired orientation of the driving shaft.

According to claim 6, the flap shaft can be actuated via a worm gear. This causes the valve flap, after it is pressed onto the seat on the housing side, to be held automatically in this position without any separate locking means.

The self-locking flap gearing disposed in the housing of the shut-off device can be given a simple design with the features of claim 7 to convert the rotational movement of the driving shaft into a translational movement of the valve flap.

Further embodiments of the invention according to claims 7 to 10 relate to different possibilities of designing the flap gearing.

The inventive shut-off device can be further improved in that it can also be used with extremely high medium pressures, retains its sealing effect independently of temperature and can be actuated with a relatively low expenditure of force.

This can be solved according to the invention by the features of claim 11. The auxiliary valve being opened before the valve flap is opened brings about pressure relief. Since the closing member is directly guided in the shutting flap and the flap valve disk is pressed axially onto the rearward channel openings, the auxiliary valve and the valve flap can be actuated in a relative smooth manner, the auxiliary valve also achieves a sealing effect which is virtually independent of temperature.

The features of claim 12 allow for the auxiliary valve to be automatically closed as soon as the valve flap is placed on its seat. The features of claim 13 achieve sufficiently strong spring effects which always hold the closing member with its valve disk lying firmly against the valve flap, except when the opening movement of the valve flap is initiated, so that the parts of the auxiliary valve perform all rotary movements and axial movements of the valve flap at the same time.

In the embodiment of the invention according to claim 14, the free cross-section of the auxiliary valve can be selected and accommodated on a relatively small valve flap surface.

The embodiment of the invention according to claim 15 takes up the arrangement of the flap gearing which has a pinion as a driver and a flap projection designed as a toothed rack. In this embodiment there is a symmetrical load on the auxiliary valve and the valve flap, on the one hand, but a short lever arm between the driving shaft and the toothed rack, on the other hand, i.e. a small diameter of the pinion, so that the valve flap can be opened and closed with relatively little effort. All sequences of movement of the valve flap and the auxiliary valve are initiated exclusively via the driving shaft.

If the embodiment according to claim 16 is realized there is the advantage that the position of the valve disk is ensured by a guide in the valve flap.

The embodiment of the invention according to claims 17 and 18 ensures the possibility of shifting the auxiliary valve smoothly.

The inventive shut-off device can be opened evenly and gently even at high medium pressures acting in the closing direction of the valve flap, which is attained with a simplified overall construction.

This is the purpose of the features of claim 19. The two cam lobes staggered by 180° ensure that the valve flap is guided constantly and free from play during the axial closing and opening movements. During these movements the cam lobe on the flap side presses the valve flap onto the valve seat, while the cam lobe on the cover side prevents an uncontrolled jerky closing movement, e.g. due to flow forces. During opening, the cam lobe on the flap side causes the flap to be actively pulled back against pressure forces as well, while the cam lobe on the flap side now prevents the valve flap from fluttering. When the cam hits the guard in the gearbox, the translational movement of the valve flap turns into a joint rotary movement of the valve flap and the ring wheel, thereby completely unblocking the passage through the valve.

In usual cases the valve flap can be turned back out of the opened swivel position into the pre-shutting position without any problem because frictional forces act between the cam body and the gearbox, thereby transmitting a backward torque of the driving shaft to the valve flap. When the cam turns slightly with respect to the gearbox the cam lobe on the flap side attacks the valve flap slightly eccentrically, thereby additionally facilitating the backward rotation. In the case of larger flow forces the closing rotation of the valve flap is facilitated by the features of claim 20.

The features of claims 21 to 24 constitute different possibilities of designing the inventive energy accumulator.

When the features of claim 25 are realized, the ring wheel locks in the pre-shutting position on the guard fixed on the housing as soon as the valve flap is rotated out of the opened swivel position. The valve flap then lies against the valve seat in the way described above. Due to the locking, the valve flap cannot be swung when being withdrawn axially from the valve seat even in the case of large flow forces. Only when the cam has reached its guard limiting the opening path of rotation is the locking of the ring wheel released.

Realization of the features of claim 26 ensures that the locking cannot be released due to the frictional forces acting between the cam body and the gearbox, but only when the cam hits the rotation guard.

The inventive shut-off device is particularly suitable for pipes in which hot gases or liquids flow which can behave in a chemically aggressive manner and tend to deposit in the pipe. These include the media of chemical plants which flow in pipes, but also flue gas take-offs which are necessary for the detoxification of flue gas, e.g. the desulfurization of flue gas. Inventive shut-off devices have considerable advantages in such and in comparable applications due to their mode of operation. Since the valve flap swivels in and out, it behaves like a hinged valve, i.e. it can open up and close a pipe cross-section formed in a tubular through-way housing unlike valves which are based on a deflection of the direction of flow. Since, on the other hand, the valve flap performs an axial movement in the manner of a seat valve when it is pressed onto its seat or lifted therefrom, it behaves like a valve disk. This means, for instance, that considerable closing forces can be generated via the driving shaft, which also allow metal seats or seals made of materials which can withstand high temperatures and/or attack by chemical action.

In the embodiment assumed as being known at the outset, the ring wheel runs with one of its segments on a guard provided in the housing on one side with respect to the center of the shaft before the valve flap is axially displaced as described. The springs serving as a displacement means in this construction lift the valve flap off its housing seat when the shaft is rotated backward, and place it back on the ring wheel. In the case of such a shut-off device, large pressure differences to be sealed off and/or large nominal widths also lead to considerable difficulties when they act on the side facing away from the gearing.

The driving shaft is supported only in the housing recesses and therefore behaves like a beam on two supports. Since the shaft is loaded approximately in the center with the pressure differences to be sealed off and the closing forces, it is subjected to bending stress between the housing recesses. Thus, even small forces lead to deformations in the driving shaft, which neutralize the tightness of the valve flap on its seat. Furthermore, permanent deformations of the driving shaft readily come about. They can be counteracted only to a limited extent by large shaft cross-sections. Such measures can no longer be considered for high pressures.

The springs also cause difficulties, which are mainly due to the properties of the spring steels. These materials can in fact not withstand the considerable temperatures of flowing media which occur in various applications of the inventive shut-off device. Chemically aggressive flow media also cause corrosion of the spring steel. This is virtually unavoidable and causes frequent repairs. The springs are also disadvantageous constructionally since, for instance, they take up space and in the form of flat spiral springs in any case require guide means of their own.

The invention is therefore also based on the problem of designing a shut-off device of the stated type in a simple manner so that it can better withstand the stresses and shows less need for repairs even under extreme conditions of application.

This problem is solved according to the invention by the features of claim 27. Expedient embodiments of the invention are the object of subclaims 28 to 35.

According to the invention, the ring wheel segment which is most highly loaded depending on the pressure head is supported by the guard fixed on the housing directly beside the shaft recesses in the housing, if possible. The swivelled in ring wheel then serves as a support for the driving shaft because the shaft load produces virtually no torque on the ring wheel the closer the guards are to the shaft. This support is of benefit to the driving shaft on its portion extending in the free cross-section of the housing and absorbs the forces acting on the driving shaft either during closing, i.e. the closing pressure on the seat of the valve flap and the counter-pressure on the valve flap, or the pressure difference acting in the closing direction. The bending stress on the driving shaft is thus reduced to such an extent that the tightness at the valve seat is ensured even at high pressures and permanent bends in the shaft no longer occur even if small shaft cross-sections are used.

Preferably and with the features of claim 28, the described relief of the driving shaft can, in a simple manner, be made independent of the direction in which the shaft load that is larger in any particular case takes effect and which is dependent on the direction in which the housing is built in. The features of claim 29 are used according to the invention to enlarge the guard surfaces and thus the length of the shaft support. It is thus possible to support a considerable perimeter of the ring wheel on the guards in every possible direction of load, thereby further reducing the load on the shaft.

The features of claim 30 can also be realized independently of the features of claims 27 to 29. This makes it possible to obtain the desired higher loading capacity and lower need for repair due to the complete omission of the springs required up to now. When the shut-off device is closed, the valve flap is already positioned in the axial guide on the housing. This causes any torques which might be transmitted, for example, from the pushing member to the valve flap in spite of the flap being guided in the swivelled in ring wheel, to be absorbed by the guide fixed on the housing. If the driving shaft is actuated in the reverse direction of rotation to open the valve flap, the entire torque of the ring wheel triggered thereby is carried off from the valve flap on the axial guides fixed on the housing. Thus, the coupled gear can only move the valve flap axially and produces the kinetic energy stored up to now by the springs used as a pull-back means.

The invention is advantageous in that the new shut-off device can withstand higher pressures and more aggressive flow media without constantly requiring repairs. The closing pressures which can be attained on the valve seat are so considerable that, in spite of the contamination on the seat and the seat rims, the contamination can be removed and higher tightness achieved. Even if such contamination does not occur, or at least not to a disturbing extent, seals can be sufficiently loaded with these pressures if their material is designed for high temperatures and/or high chemical resistance. Also, the opening movement of the valve flap against high pressure differences generally no longer requires supporting measures, but can be effected solely with the forces of the coupled gear. This considerably simplifies the overall construction and reduces the repair efforts accordingly.

Preferably and with the features of claim 31, the axial guide is considerably simplified. The tracks of travel generally require only a small axial length because the closing movement of the valve flap is usually short.

Using the features of claim 32 the construction of the inventive shut-off device can be simplified further because round bolts can be easily provided through bores in the housing and welded with annular seams. The L-shaped recesses need not be provided in the valve flap itself. This results in an uninterrupted seat of the valve flap along its entire periphery.

The features of claim 33 can be used to dispose all parts of the coupled gear on the back of the ring wheel, the pushing member being in turn disposed on the back of the valve flap, i.e. on its side facing away from the seat.

The features of claim 34 result in a further simplification of the construction because the two movable bearings of the ring wheel and the coupling axle can be combined in one constructional unit.

In the case of high pressure differences in the inventive shut-off device or of valve flaps with large areas, the valve flaps, which cannot be designed to have any desired thickness, may also be loaded so heavily that they bend at their rims and start to leak there if the valve flaps in question are displaced exclusively via an operating force of the gearing attacking them more or less in the middle. The embodiment of the invention according to claim 36 does not involve these disadvantages. This is based on the fact that the cams acting simultaneously on the guards of the valve flap in turn transmit axial forces to the valve flap toward the seat fixed on the housing, so that the flap middle of the guards, if they are correctly adjusted, must only transmit a fraction of the force. Since the cams are provided in the immediate vicinity of the flap rim, they support the valve flap in such a way as to virtually rule out its bending.

Preferably and with the features of claim 37 the overall force is distributed over pairs of cams and the power take-off of the gearing in the middle of the flap. Furthermore, the flap guards, when embodied by screws, are adjustable so precisely that the division of force can be performed with the necessary accuracy.

In so far as the embodiments of the invention are to be provided with claim 30 and the described advantages of distributing the force over the pairs of cams, the realization of the embodiment according to claim 38 is recommended.

The embodiment according to claim 39 is advantageous in that it combines the advantages of a gearing design according to claim 3 with the embodiments described above. The flap projection serving as the power take-off of the gearing can be given a sufficient length for large axial displacement paths and serves in the embodiment according to claim 39 at the same time as a power-transmitting member onto the coupling shaft.

The details, further features and other advantages of the invention can be found in the following description of embodiments of the invention with reference to the figures in the drawing. These show:

DETAILED DESCRIPTION OF THE INVENTION

Figure 1:
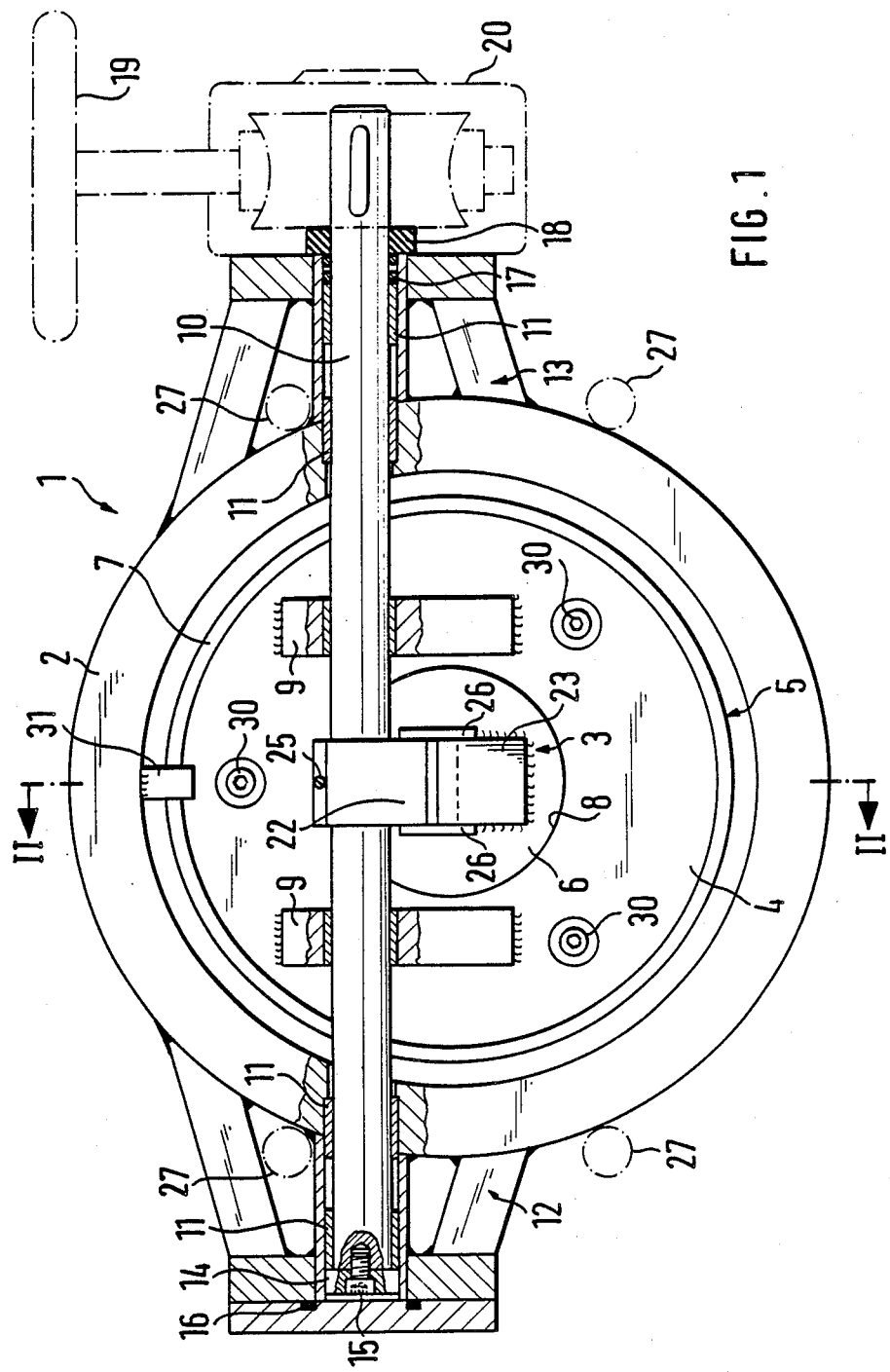
FIG. 1 is a front view of a first embodiment of the inventive shut-off device, which is shown in cross-section in the area of the driving shaft.

FIGS. 1 to 4 show a shut-off device (1) impervious to the pressure of a medium in both directions, having a tubular housing (2) and a valve flap (3) guided in an axially displaceable manner in a ring wheel (4). This guidance is effected via a cylindrical projection (6) on the valve flap (3) which engages the opening (8) in the center of the ring wheel (4) and via a one-sided outer flange (7) on the valve flap (3) which embraces the ring wheel (4).

The ring wheel (4) is seated with two movable bearings (9) on the back on a driving shaft (10) which transversely penetrates the housing (2) and is located in a doubly eccentric position, i.e. outside the longitudinal and transverse axes of the valve flap (3). It is mounted firmly in the housing (2) in rotatable fashion in bearing bushes (11) in lateral protrusions (12, 13) on the housing (2). Longitudinal adjustment of the shaft (10) is possible via an adjusting member (14) with a socket head cap screw (15). It is sealed off from the outside by a plurality of sealing rings (16 to 18).

The driving shaft (10) is rotated steplessly by a handwheel (19) shown in dot-dash lines. The shaft forms the entrance to a self-locking worm gear (20) also shown in dot-dash lines.

In the interior of the housing there is a self-locking gearing (21) by which the valve flap (3) can be displaced under the guidance of the ring wheel (4). The gearing has a driver located radially to the driving shaft (10), which acts upon a flap projection (23). This projection penetrates the opening (8) in the ring wheel (4). According to the embodiment shown in FIGS. 1 and 2, the flap projection (23) is designed as a toothed rack welded onto the value flap (3). The driver (22) is a pinion which is seated on the shaft (10) so as to rotate therewith by means of a feather key (24) and a setscrew (25). To improve the guidance, the driver (22) has two screwed on cheeks (26) laterally enclosing the projection (23).

The shut-off device (1) is flanged to pipe flanges with the aid of tension screws (27).

Figure 2:
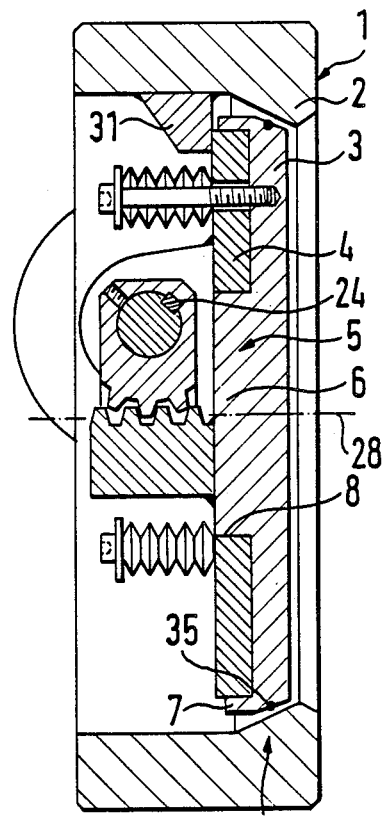
FIG. 2 shows the shut-off device in an intermediate position before the beginning of the axial closing movement along line II/II in FIG. 1.
Figure 3:
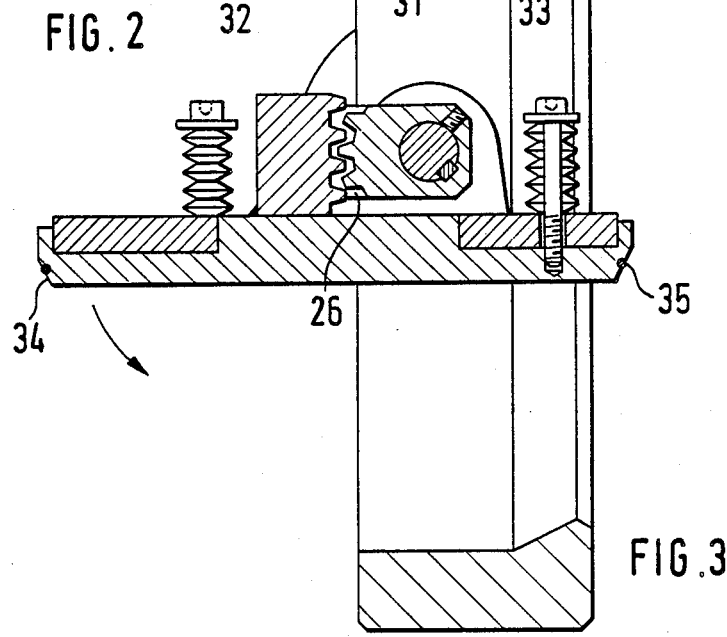
FIG. 3 shows the shut-off device in a completely open state in the view corresponding to FIG. 2.
Figure 4:
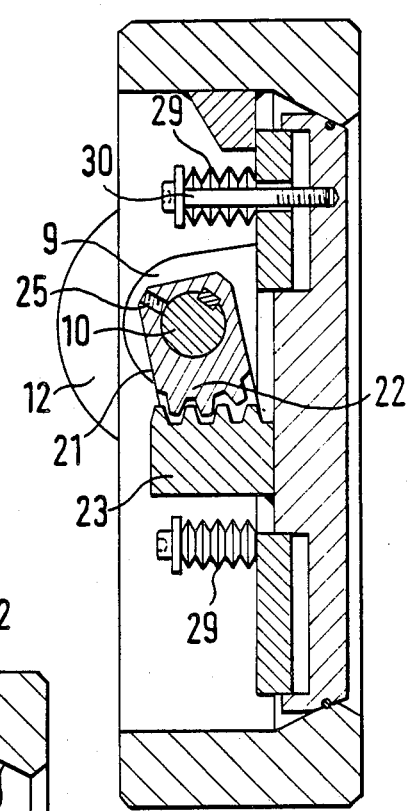
FIG. 4 shows the shut-off device after the valve flap has been laid against the seat fixed on the housing in the view corresponding to FIGS. 2 and 3.

The mode of operation is shown in FIGS. 2 to 4, which depict different positions of the valve flap (3). FIG. 3 shows the open position in which the valve flap (3) is parallel to the axis of flow (28) and unblocks the inside cross-section of the housing (2). In this position the valve flap (3) and the ring wheel (4) are located directly against each other. This results in a shape favorable to flow. In this position the ring wheel (4) and the valve flap (3) are held together by pull-back springs (29), which are disk springs. They surround expansion bolts (30) screwed into the back of the valve flap (3) and penetrating the ring wheel with play. If a horizontal arrangement of the driving shaft above the axis of flow

(28) has been selected, as shown, the cohesion of the ring wheel and the valve flap is ensured even without the pull-back springs (29) because the ring wheel (4) which is freely rotatable on the shaft (10) is supported by its own weight on the valve flap (3), which in turn is connected with the shaft (10) so as to rotate therewith by the projection (23) and the gear connection of the driver (22).

If the valve flap is to be closed, the driving shaft (10) is rotated. The valve flap (3) and the ring wheel (4) are then rotated jointly with the driving shaft (10) until the ring wheel (4) hits a guard (31) on the housing side in accordance with the view in FIG. 2, this guard determining a position of the valve flap (3) at right angles to the axis of flow (28). When the driving shaft (10) rotates further, the ring wheel (4) is supported on the guard (31) so as to be fixed on the housing, so that the further rotational movement of the driving shaft (10) now overcomes the self-locking of the gearing. Due to the coupling of the driver (22) and the flap projection (23) an axial displacement of the valve flap (3) relative to the ring wheel (4) then occurs. The pull-back springs (29) are compressed in the process. This movement in the direction of the axis of flow (28) finally causes the valve flap (3) to be placed onto a seat (32) on the housing side in accordance with FIG. 4. The worm gear (20) and the lever arm between the shaft (10) and the flap projection (23) allow for high pressure forces. In the embodiment according to FIGS. 1 to 4 the sealing surfaces (33, 34) of the seat (32) on the housing side and the valve flap (3) have a conical or tapered design. The valve flap (3) has an additional ring seal (35). The self-locking worm gear (20) ensures that sufficient pressure force is always effective on the sealing surfaces (33, 34). In the completely closed position according to FIG. 4, the ring wheel (4) remains embranced at the periphery by the rearward guide flange (7) on the valve flap (3) because its depth is selected so as to be larger than the maximum axial displacement path of the valve flap (3).

If the shaft (10) is rotated in the opposite direction, the valve flap (3) is first cleared axially and then drawn back until it lies against the ring wheel (4). This is effected by the pull-back springs (29). The overall arrangement is swivelled into the open position according to FIG. 3 or any intermediate position desired.

Figure 5:
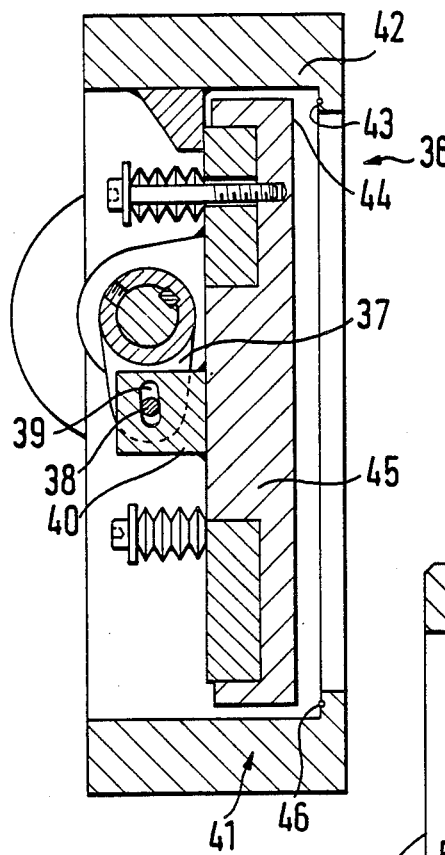
FIG. 5 illustrates a second embodiment of the inventive shut-off device in the view corresponding to FIG. 2.

FIG. 5 shows a different embodiment in which the essential parts of the shut-off device (36) are constructed identically to the embodiment according to FIGS. 1 to 4. However, in the shut-off device (36) the driver is designed as a lever (37) which engages via a peg (38) in a transverse slot (39) in the flap projection (40). Furthermore, the seat (41) of the housing (42) has a flat sealing surface (43) on its face, against which a sealing surface (44) on the face of the shutting flap (45) lies. The advantage of this embodiment is that no sliding friction and thus virtually no phenomena of wear occur between the two sealing surfaces (43, 44). A ring seal (46) which may be set into the sealing surface (43) on the housing side then has a long service life.

Figure 6A:
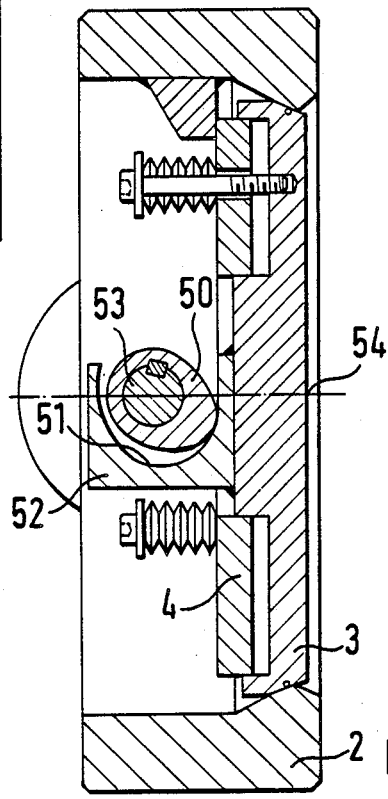
FIGS. 6a and 6b show two further modified embodiments of the shut-off device in a view corresponding to FIG. 4.
Figure 6B:
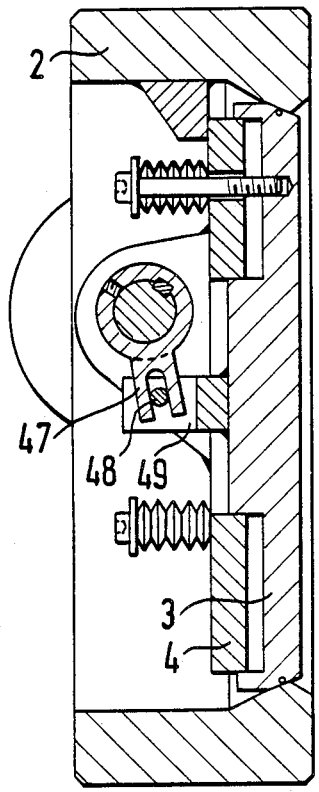

In the view according to FIG. 6b, the valve flap (3) and the ring wheel (4) correspond to the embodiment according to FIG. 2. The driver is a fork (47), however, which a peg (48) on the flap projection (49) engages.

FIG. 6a shows a driver which is designed as an eccentric cam (50). It engages with play a receiving hollow (51) in the flap projection (52). The driving shaft (53) can be located in this case at the level of the axis of flow or the center (54) of the flap, which results in favorable conditions for power transmission.

FIGS. 7 to 11 show an inventive shut-off device (55) impervious to the pressure of a medium in both directions, having a tubular housing (56) and a valve flap (57) which is mounted in axially displaceable fashion on a ring wheel (58), so that the two parts form an overall arrangement which can be swivelled jointly. The mutual guidance is effected via a central cylindrical projection (59) on the valve flap (57) which engages the central opening (60) in the ring wheel (58), and via a rearward guide flange (61) on the flap (57) which surrounds the ring wheel (58) along its periphery. The ring wheel (58) is seated with two rearwardly protruding movable bearings (62)—only one (62) of which is visible in the drawings—rotatably on the driving shaft (63), which penetrates the housing (56) transversely.

The shut-off device (55) has a drive means (64) for the axial displacement of the valve flap (57) relative to the ring wheel (58). The drive means consists of a driver provided on the driving shaft (63) in the form of a pinion (65), which engages a flap projection (66) having the form of a toothed rack. The toothed rack forming the flap projection (66) is screwed onto a separate closing member (68) which is limitedly displaceable in a central opening (67) in the flap (57) and bears on its back, i.e. on the toothed rack side, a valve disk (69) which covers the rearward channel openings of a plurality of channels (70) penetrating the valve flap (57). The valve disk (69) is partly located in an enlarged bore (71) in the projection (59) of the valve flap (57). Between the valve disk (69) and the bottom of this enlarged bore (71) there is a sealing disk (72) which is provided with openings in the area of the channel openings.

The channels (70)—preferably eight channels (70) are provided, distributed evenly along the periphery of a divided circle—surround the opening (67) concentrically and are inclined so as to converge toward the rearward end so that their rearward openings run together under the relatively small valve disk (69).

The central opening in the valve flap (57) is lined with a guide sleeve (73) for the closing member (68). The closing member (68) bears at its front end a pull-back spring assembly (74) which together with the closing member enclose the valve flap (57).

The pull-back spring assembly (74) consists of a disk spring assembly (75) which is clamped between the valve flap (57) and an abutment plate (76) screwed onto the closing member (68). As can be seen in the view in FIG. 8, the toothing of the flap projection (66) is located coaxially to the central axis (77) of the closing member (68) and at the same time to the central axis of the overall shut-off device (55).

The mode of operation of the shut-off device described in FIGS. 7 to 11 is as follows. To close the device, the shaft (63) is rotated in a counterclockwise direction in FIG. 7, whereby the entire arrangement supported by the shaft (63) is first suspended in the direction of the arrow (78) until the ring wheel (58) hits an upper guard (79) which is fixed on the housing but adjustable. When the shaft (73) rotates further in the counterclockwise direction, the ring wheel (58) stops while the toothed rack (66) is pushed forward axially, the closing member (67) thereby being pushed forward axially with the valve flap (57) until the sealing surface (80) of the valve flap (57) is seated on the countersealing surface (81) on the housing (56).

Figure 7:
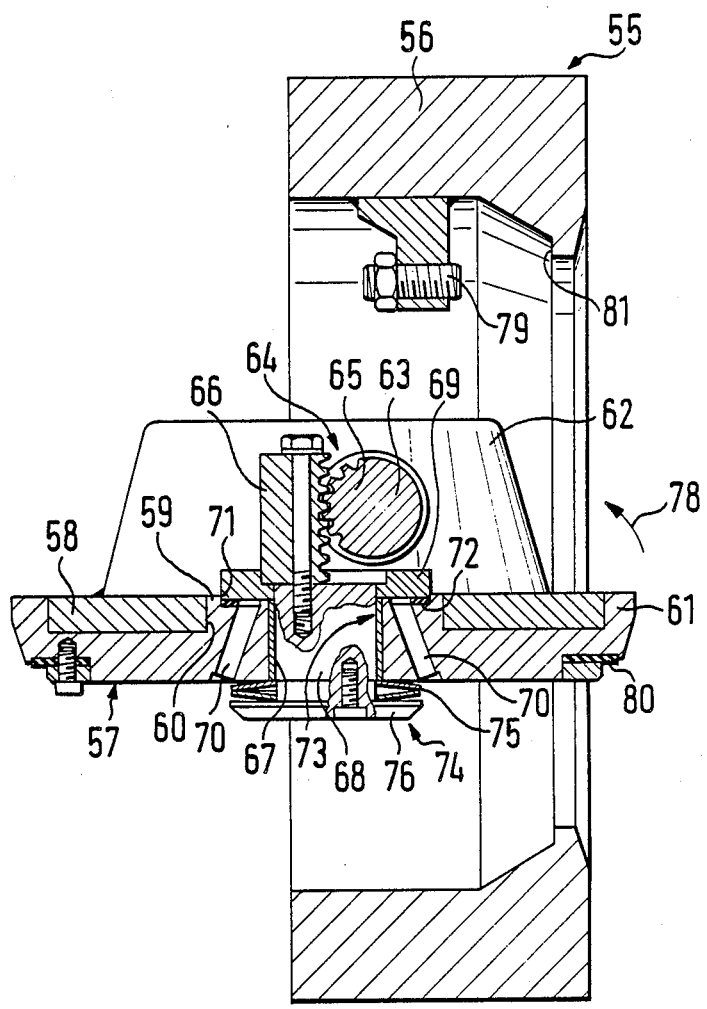
FIG. 7 illustrates a longitudinal central section of the shut-off device according to the invention in a completely open state and in a further embodiment.
Figures 8, 9:
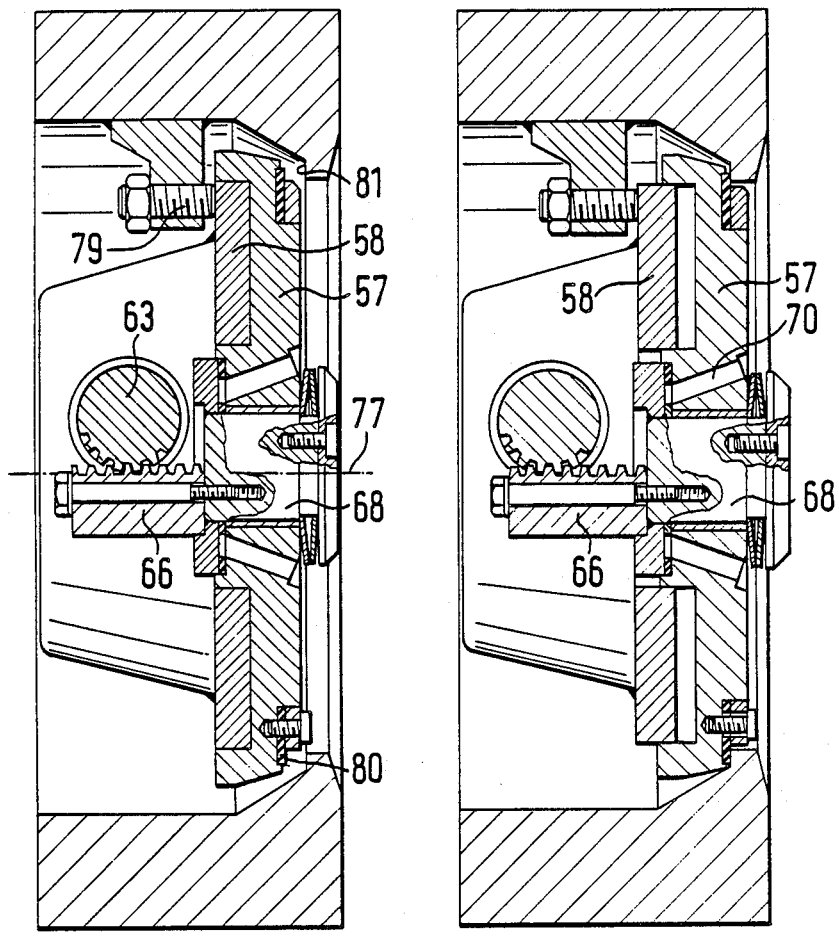
FIG. 8 shows the shut-off device according to FIG. 7 in a pre-shutting position.
FIG. 9 shows the shut-off device according to FIGS. 7 and 8 with the valve flap closed.

In the case of a lack of pressure—or when the pressure of the medium acts upon the front (the right-hand side in FIG. 9) of the valve flap (57)—the shut-off device opens by passing through, in the reverse order, the position as in FIG. 8 to the completely open position as in FIG. 7.

However, if the valve flap (57) is pressed by a high medium pressure onto the valve seat in the position as in FIG. 9, the channels (70), when the valve flap (57) opens, act in combination with the closing member (68) as an auxiliary valve which first opens and effects a pressure relief before the valve flap (57) itself is lifted off the valve seat.

Figure 10:
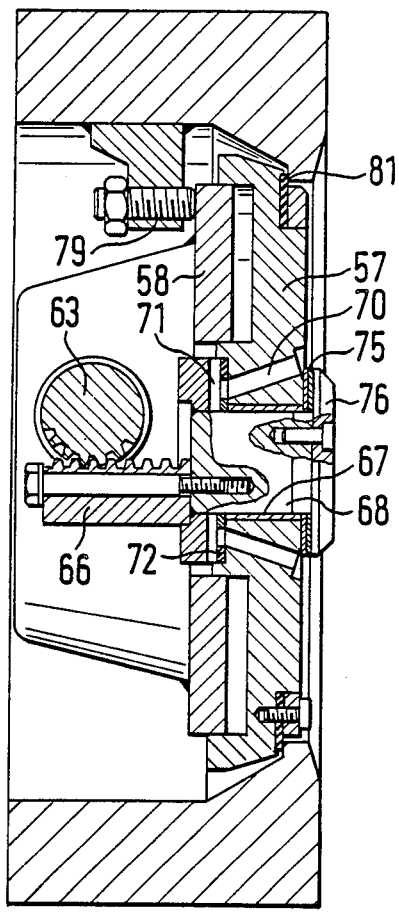
FIG. 10 illustrates the shut-off device according to FIGS. 7 to 9 at the beginning of an opening process.
Figure 11:
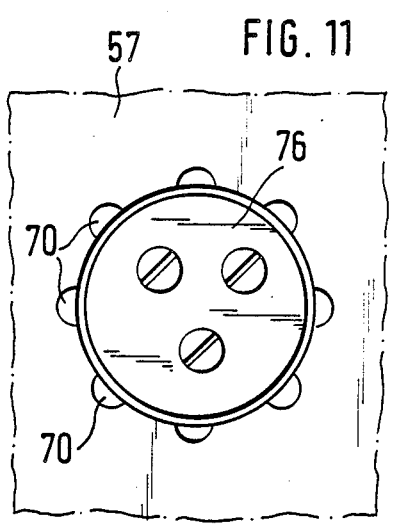
FIG. 11 is a detail of the front of the valve flap according to arrow XI in FIG. 10.

If the shaft (63) is rotated in a clockwise direction at the beginning of an opening process in the position as in FIG. 9 the toothed rack draws the closing member (68) back from the valve flap (57) while compressing the disk spring assembly (75), the valve disk (69) being lifted off the rearward openings of the channels (70) and now unblocking a relief flow which goes around the valve disk (69) through the enlarged bore (71), through the openings in the sealing disk (72) and through the channels (70). FIG. 10 shows the valve flap in a position in which the auxiliary valve has just opened. As soon as the pressure difference has become small enough on each side of the shutting flap (57), the disk spring assembly (75) leads the valve flap into a position as in FIG. 8, out of which the shut-off device can then be swivelled back into the previous open position as in FIG. 7.

Figure 12:
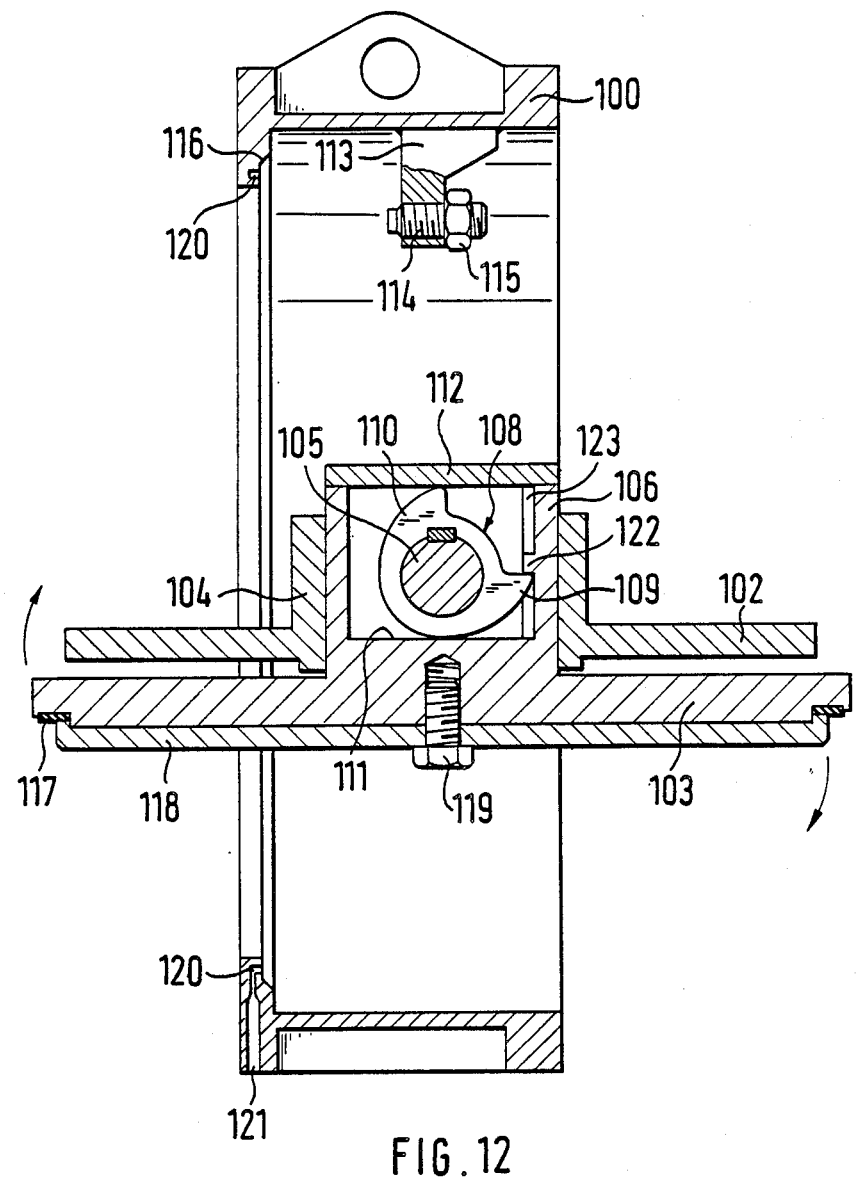
FIG. 12 illustrates a shut-off device according to a different embodiment of the invention in a completely open position.
Figure 13:
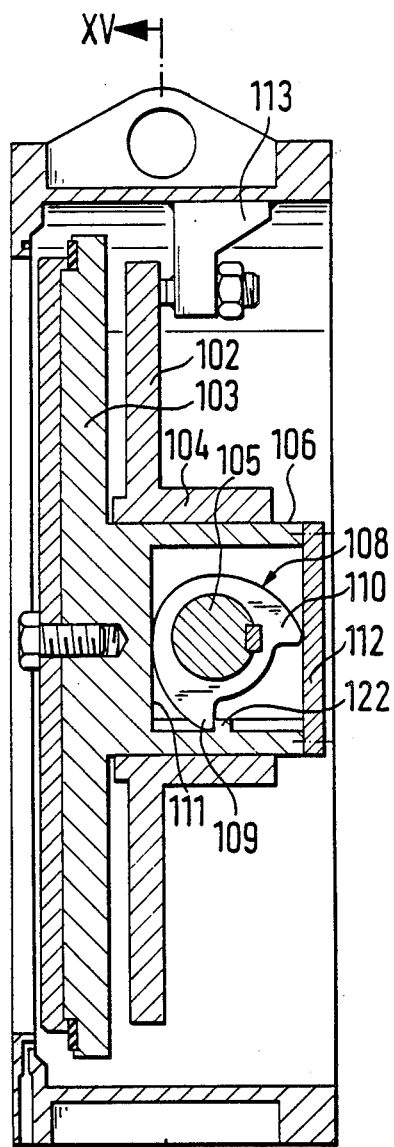
FIG. 13 shows the shut-off device according to FIG. 12 in the pre-shutting position.
Figure 18:
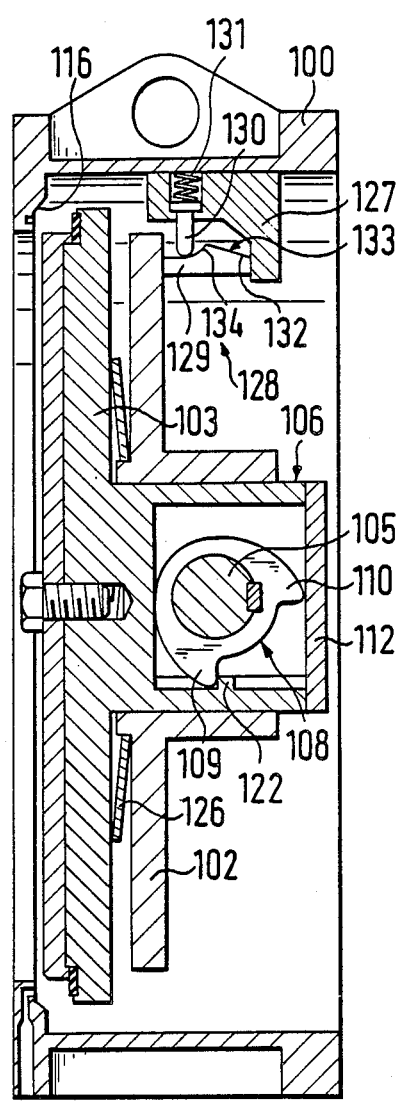
FIG. 18 shows a shut-off device with a locking means for a guide disk.
Figure 19:
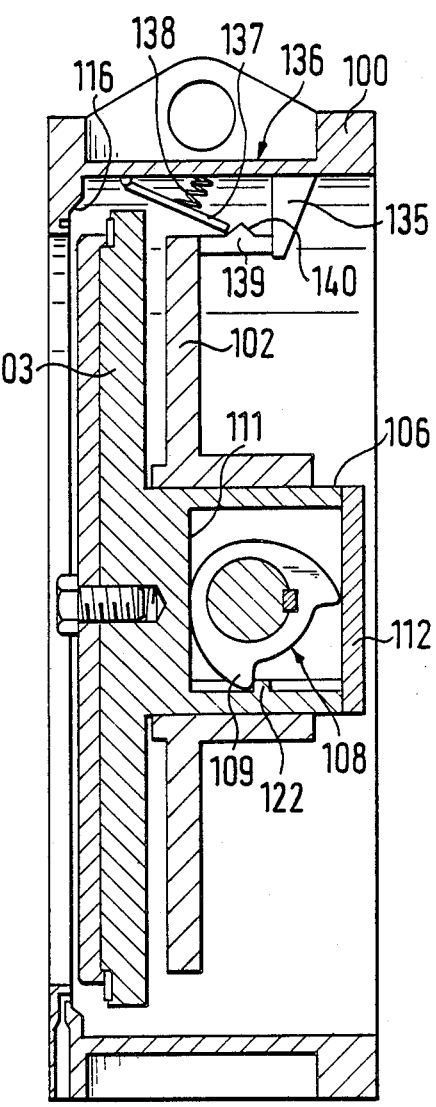
FIG. 19 shows a shut-off device in a modified embodiment with a locking means.

FIGS. 12 and 19 illustrate the construction of a valve flap for pipes according to the invention. The tubular housing (100) in which the ring wheel (102) and the valve flap (103) are pivoted can be seen in FIGS. 12 to 19. The ring wheel (102) has a rearward cylindrical guide projection (104), in which it is mounted in freely rotatable fashion on a driving shaft (105) penetrating the housing (100). A rearward, likewise cylindrical gearbox (106) of the valve flap (103) is guided in translationally displaceable fashion in the guide projection (104) on the ring wheel (102) and has an enlarged opening (107) for the driving shaft (105) (cf. FIG. 15).

A cam (108) connected with the driving shaft (105) so as to rotate therewith is enclosed in the interior of the gearbox (106) of the valve flap (103), the cam having two cam lobes (109 and 110) staggered by 180° with eccentric curves ascending in opposite directions. The steep flanks of the two cam lobes (109 and 110) have an angular distance of 90°. One cam lobe (109) constantly lies against the boundary wall (111) of the gearbox (106) on the flap side, while the other cam lobe (110) is constantly in contact with a cover (112) which closes off the gearbox (106) on its back.

FIG. 12 shows the valve flap in a completely open position, in which the ring wheel (102) and the valve flap (103) are swivelled by about 90° with respect to the housing (100). If the driving shaft (105) is rotated in the clockwise direction, a backward torque is transmitted via the cam (108) to the gearbox (106) of the valve flap (103), thereby swivelling the valve flap (103) and the ring wheel (102) jointly into a pre-shutting position as in FIG. 13. This swivelling movement is limited by a guard (113) fixed on the housing which hits the back of the ring wheel (102), the exact position of the guard being adjustable by a check screw (114) with a counter nut (115).

When the driving shaft (105) rotates further, the cam lobe (109) presses with an ascending eccentric curve onto the boundary wall (111) on the flap side, thereby displacing the valve flap (103) translationally relative to the ring wheel (102) toward a valve seat (116) on the housing (100). The eccentric curve of the rearward cam lobe (110), however, has a descending tendency in the case of rotation in the clockwise direction, so that the cam lobe (110) always lies against the cover (112) but does not obstruct the translational movement.

Figure 14:
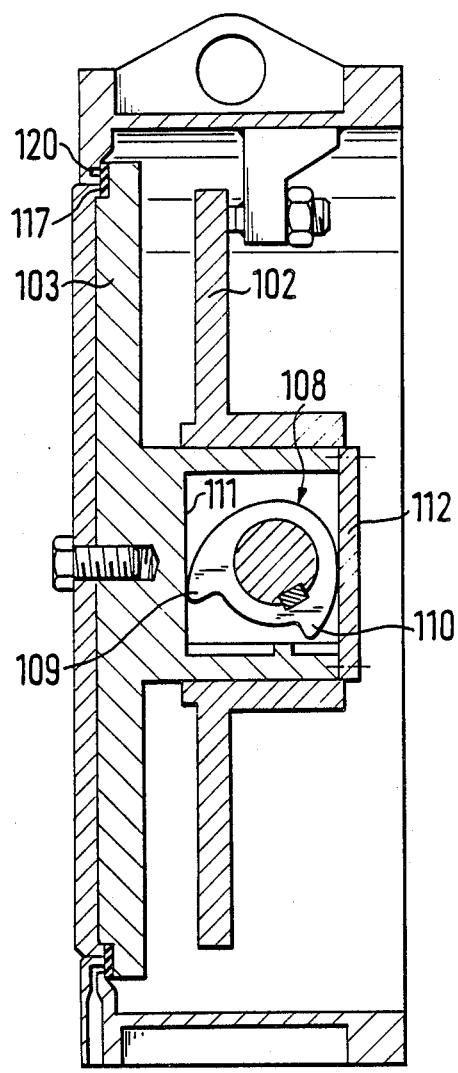
FIG. 14 shows the shut-off device according to FIGS. 12 and 13 in a completely closed position
Figure 15:
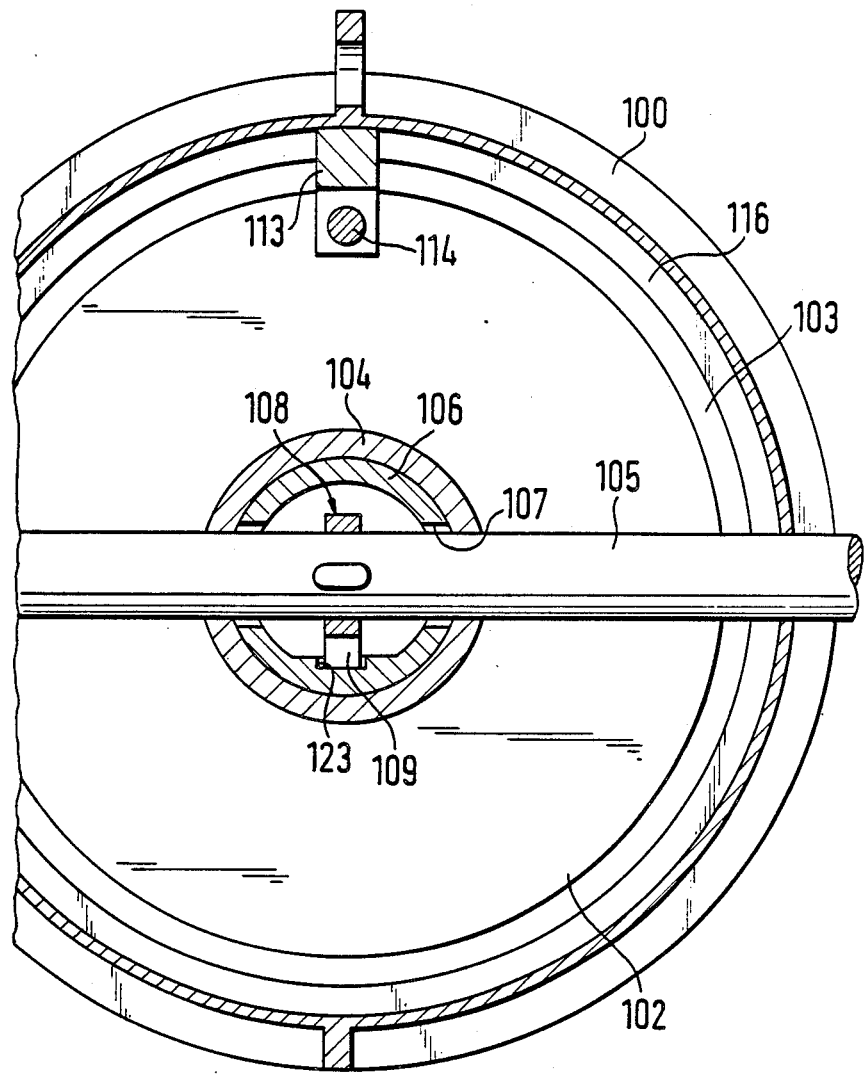
FIG. 15 illustrates the shut-off device in cross-section along line XV/XV of FIG. 13.
Figure 16:
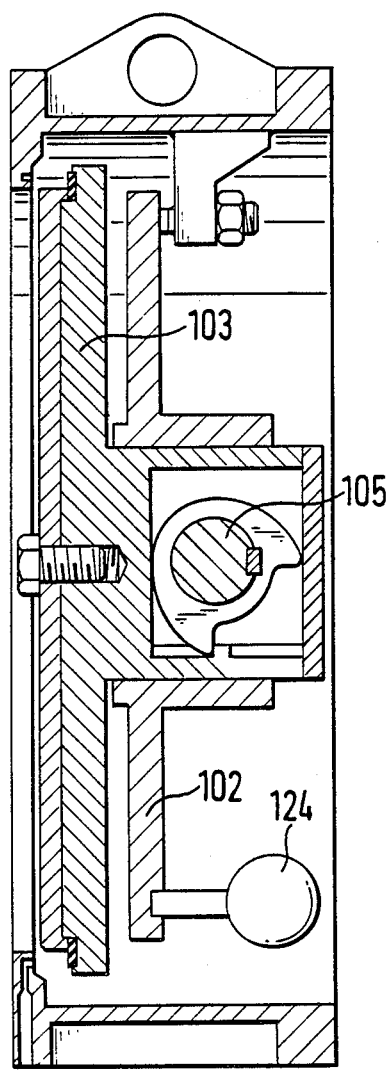
FIG. 16 shows a shut-off device with a weight as an energy accumulator in the view corresponding to FIG. 13.

Due to the translational movement the valve flap (103) finally reaches a complete shutting position as in the view of FIG. 14, whereby it is supported by a sealing ring (117) running around it on the valve seat (116) on the housing side. In order to obtain exact positioning and at the same time make it easy to replace the sealing ring (117), the latter is fastened by a separate mounting disk (118) which is attached to the valve flap (103) by a screw (119).

The valve flap (103) can be lifted off the valve seat (116) again any time by rotating the driving shaft (105) in the counterclockwise direction. In order to facilitate the detachment of the sealing ring (117) from the valve seat after the shut-off device has been in a closed position for a long period, e.g. several weeks, the valve seat (116) has an annular groove (120) which can be subjected to a pressure medium via a bore (121). The translational opening movement of the valve flap (103) is effected by the cam lobe (110), which presses on the back cover (112), now with an ascending tendency. When the pre-shutting position as in FIG. 13 is reached again, the cam lobe (109) on the flap side hits a guard (122) which is designed as a protrusion within a groove (123) in the gearbox (106). When the cam lobe (109) lies against the guard (122) this initiates a joint rotational movement of the valve flap (103) and the guide (102) until the completely open swivel position as in FIG. 12 is finally reached.

In order to make it easier for the valve flap (103) and the ring wheel (102) to swivel back out of the completely open position as in FIG. 12, the parts may be loaded in the closing direction by an energy accumulator. According to the view in FIG. 16 the energy accumulator is a weight (124) which, in the pre-shutting position shown, is located below and at the same time at the back beside the driving shaft (105) which defines the swivel axis. The weight (124) may be connected with the ring wheel (102) or else with the valve flap (103).

Figure 17:
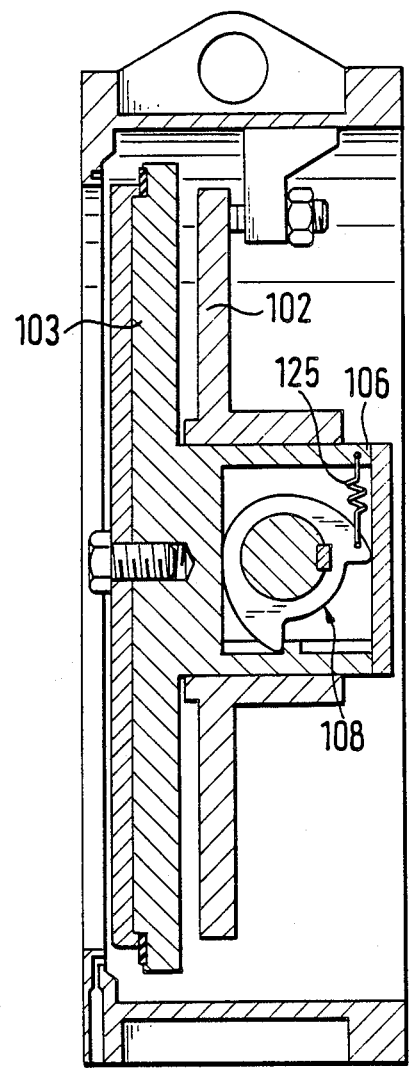
FIG. 17 shows a shut-off device with a spring as an energy accumulator in a view corresponding to FIG. 13.

According to the view in FIG. 17 the energy accumulator is a tension spring (125) which is clamped between the cam (108) and the flap guard housing (106).

FIG. 18 shows an embodiment of the inventive shut-off device in which a disk spring (126) is disposed between the valve flap (103) and the ring wheel (102). This spring constantly presses the cam lobe (110) of the cam (108) against the cover (112) so that high frictional forces occur in this position. Therefore, a sufficient backward torque out of an open swivel position as in the view in FIG. 12 is reached in any case. In a completely closed position as in the view in FIG. 14, however, the frictional forces between the cam and the cover (112) are smaller because the disk spring (126) is relieved to a large extent.

However, in order to reliably prevent the valve flap (103) from swivelling in the counterclockwise direction when being drawn back from the valve seat (116) on the housing side, the housing (100) has a guard (127) with a locking means (128) and a ring wheel (102). The locking means (128) includes a projection (129) protruding rearward on the ring wheel (102), against which a pin (130) mounted in the housing is pressed in the transverse direction by the force of a biased spring (131). When the ring wheel (102) reaches the pre-shutting position during closing, the pin (130) first hits a flat ascending flank (132) of a protrusion (133) disposed on the projection (129). When the complete striking position is reached, the pin (130) locks behind the protrusion (133). It is difficult for the ring wheel (102) and thus the valve flap (103) to swivel in the opposite direction since the pin (130) then has to overcome the resistance of a steep ascending flank (134) of the protrusion (133). They can thus swivel back only when the cam lobe (109) of the cam (108) hits the associated rotation guard (122).

FIG. 19 shows a further embodiment of an inventive shut-off device in which the cam (108) is clamped lightly free from play in the housing (100) by the cover (112), so that relatively high frictional forces take effect for opening and closing the valve flap. When lifted off the valve seat (116) the valve flap (103) and the ring wheel (102) are prevented from swivelling by the fact that the housing (100) has a guard (135) with an associated locking means (136). The locking means (136) consists of a pivoted lever (137) which is loaded by a pressure spring (138) at right angles to a projection (139) on the ring wheel (102). When locking the projection (139) presses the pivoted lever (137) aside in the transverse direction, while when unlocking it engages almost in the axial direction thereof. Thus, a high unlocking resistance is again given.

FIGS. 18 and 19 show the locking means (128 and 136) merely schematically.

For the sake of clarity, the housing (100), the ring wheel (102) and the valve flap (103) are shown as one-piece components in FIGS. 12 to 19. In practice, a multipart welded construction may be advantageous in each case.

In FIGS. 20 to 24 the shut-off device housing is referred to as (201) and shown only in part. It has a tubular housing portion (202) and flanges (203 and 204) with which it can be built in between two pipes without any deflection of the flow in a stretch of pipe. The fork-shaped neck (205) of the housing (201) is shown cut away in FIG. 21. It may constitute the abutment for a handwheel or a motor for the driving shaft (206).

On the driving shaft a ring wheel (211) is disposed with the aid of two movable bearings (207, 208) in which bearing bushes (209, 210) are located. For this ring wheel a fixed guard consisting of two stop bars (214 and 215) is provided in the interior (212) of the housing. The back (216) of the ring wheel (211) bears a guide (217). It consists of an outer housing (218) which is in turn formed of a housing cover (219) bolted in several places and one-piece housing walls (220). The inside surfaces (221) of the housing walls (220) and a recess (222) in the ring wheel serve to guide the outer surface of a gearbox (223). The gearbox encloses a coupled gear (224). In the coupled gear there is a pushing member (226) which meshes therewith.

The gearbox (223) is seated on the back (227) of a valve flap (228). A valve flap seat (229) is provided therefor in the housing, with which a seal (230) made of a heat-resistant and chemically inert material cooperates. A disk (232) which is connected to the valve flap (228) fits into the openings (231) in the seat (229). The rim surface (233) of the disk (232) which converges forwards and inwards serves to position the disk (232), while the extended axial surface (234) is used to clean the seat opening of impurities sticking thereto.

Opposite the wheel guard fixed in the housing and consisting of the two stop bars (214, 215) each associated with one side of the swivelled in ring wheel (211) but staggered by a semicircle, the seat (229) of the valve flap (228) is disposed in the housing axially shifted in its closing direction.

Figure 20:
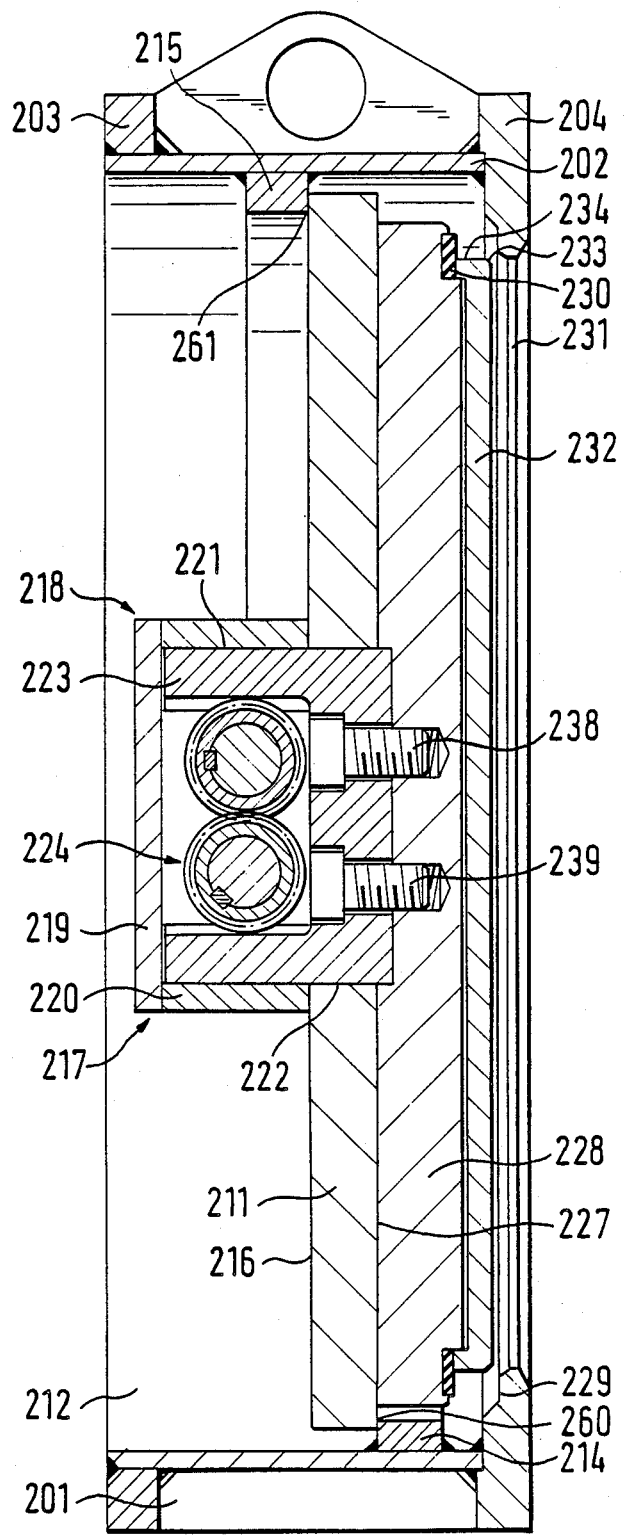
FIG. 20 is a cross-sectional view directed through a different embodiment of the shut-off device, i.e. through the shutting housing and through the driving shaft.

The valve flap (228) is held together with the ring wheel (211) in the swivelled in position of the parts as in FIG. 20, in which the ring wheel (211) and the valve flap are disposed with their planes in the housing cross-section, by the self-locking of the coupled gear (224). This self-locking comes about between the pinion (225) and a shifting pinion (235) belonging to the pushing member (226) and seated on a coupling axle (236) so as to rotate therewith. The two pinions are located in the interior of the gearbox (223) which is screwed in several places to the valve flap, as shown at (238 and 239) in FIG. 20, the screw bores ending blind and being provided on the back (227) of the valve flap. The coupling axle (236) is wedged with both ends (240 and 241) in one shifting sleeve (242, 243) each, as shown at (244 and 245) in FIG. 21. The sleeves (242, 243) therefore move together with the coupling axle (236). They transmit this movement to two bearing sleeves (246, 247) disposed at the ends of the coupling axle which run in the bearing beds (207 and 208) of the ring wheel but act on the valve flap (228).

Figure 22:
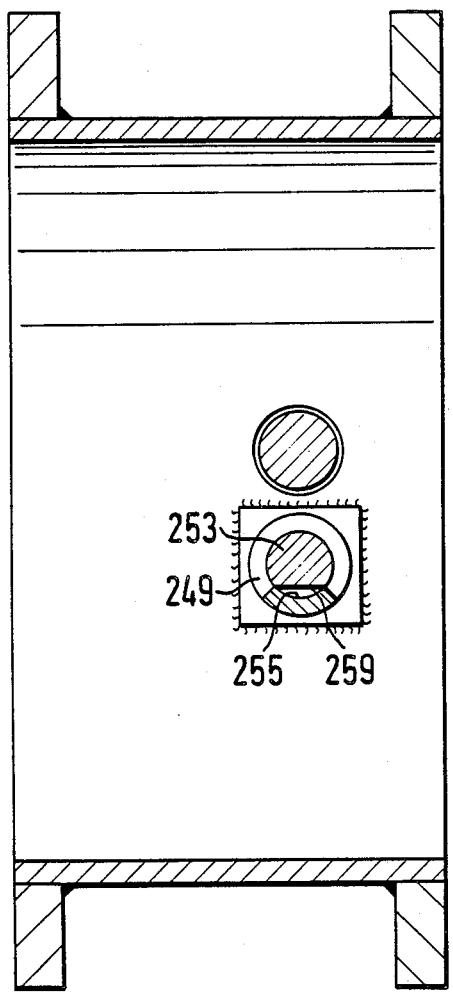
FIG. 22 is a front view in partial cross-section of the axial guide in the inventive shut-off device along line XXII/XXII in FIG. 21.

Pegs (248, 249) on an axial guide fixed on the housing protrude into the interior of the housing parallel to the driving shaft (206) and on opposite sides of the housing. The pegs are seated in housing bores and welded hard to the interior of the housing with fillet welds (250, 251). Each peg bears a track of travel (252, 253) on a flattened bolt with which it forms a constructional unit. These sliding tracks are associated with sliding blocks (254, 255) which are formed on the valve flap (228), i.e. in the ends of the shifting sleeves (242, 243) in L-shaped recesses (256, 257). As can be seen in the view of FIG. 22 by the example of the round bolt peg (249), the sliding track associated with each sliding block is disposed eccentrically.

Figure 21:
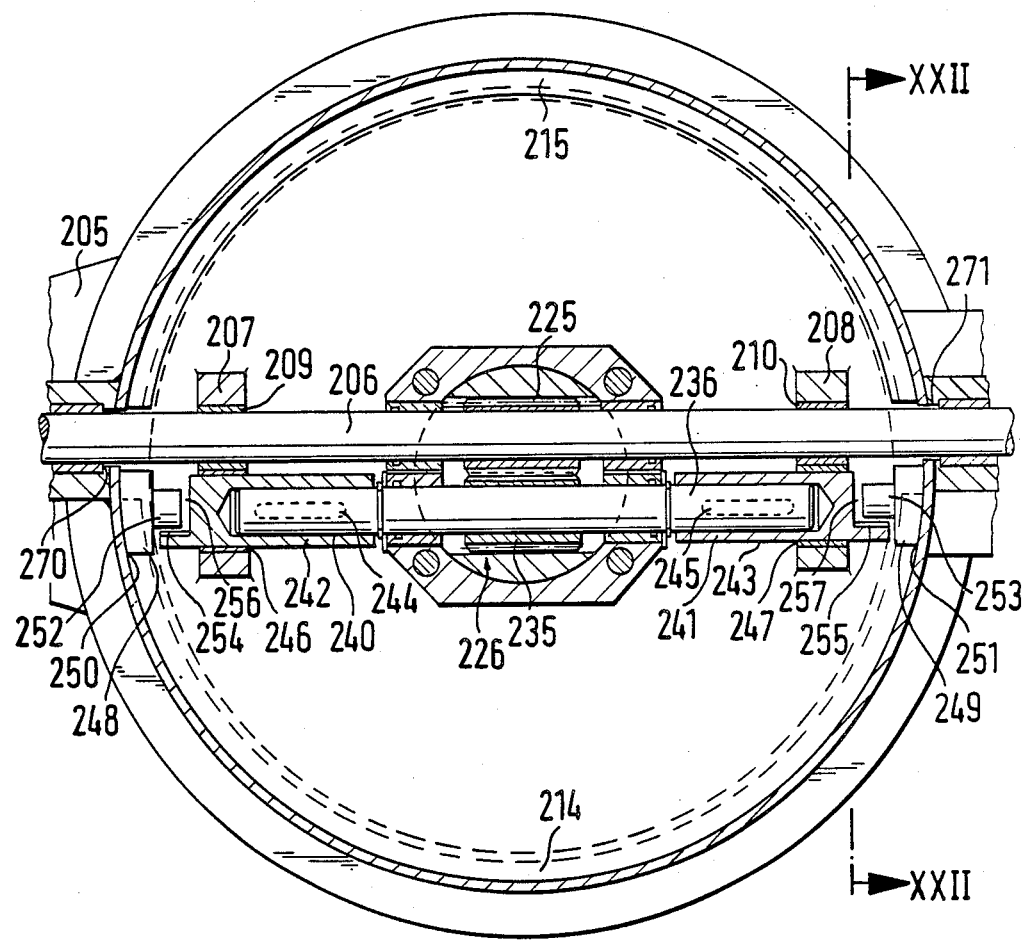
FIG. 21 is a view of the object of FIG. 20.

As can be seen in the view in FIG. 21, the stop bar or guard (215) fixed on the housing is a half-ring made of flat steel, as is the stop bar or guard (214) fixed on the housing on which the opposite side of the ring wheel (211) is supported. Both guards end beside the axle recess (270, 271) for the driving shaft (206).

In operation, the driving shaft (206) is rotated with the aid of the drive means until the two main structural components which are held together, i.e. the ring wheel (211) and the valve flap (228), have reached their position seen in FIG. 20. As soon as the rims (260, 261) of the ring wheel (211) lie against the guards (214, 215), the continuing rotation of the driving shaft (206) leads to the sliding blocks formed by the front ends of the sleeves being swivelled under the flattened areas (259) which form the sliding tracks (252, 253). The continuing rotation of the driving shaft (206) causes all rotational movement of the bearing sleeves (242, 243) to be ruled out due to the torque coming to be supported on the sliding blocks (254, 255) and the sliding tracks (252, 253). Consequently, the axle (236) now shifts the valve flap (228) axially via the bearing sleeves (246, 247). The shifting movement stops as soon as the seal has been pressed onto the valve flap seat (229). Since this requires only a small axial amount of movement, the pinions (225 and 235) do not disengage during the axial movement.

If the valve is to be opened, the driving shaft (206) is driven in a clockwise direction. Due to the locking of the valve flap (228) in the described axial guide, the pushing member is first fetched back by the movement of the pinion (235) together with the coupling axle until the sliding blocks have reached the end of the flattened area (259) or the tracks of travel (252, 253). This releases the rotational movement. Consequently, when the driving shaft (206) continues rotating, the ring wheel (211) and the valve flap (228), which are now lying against each other, swivel together by about 90° in the clockwise direction and unblock the cross-section of flow.

Figure 23:
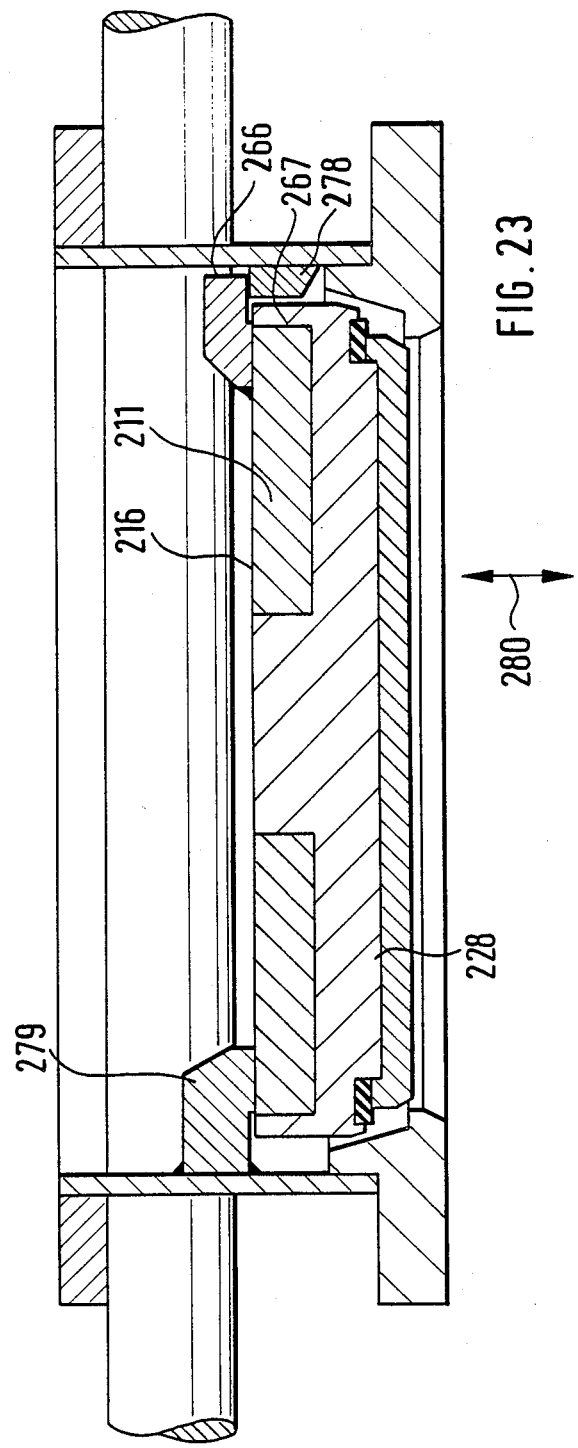
FIG. 23 illustrates a modified embodiment in a view corresponding to FIG. 20 but shifted by a semicircle
Figure 24:
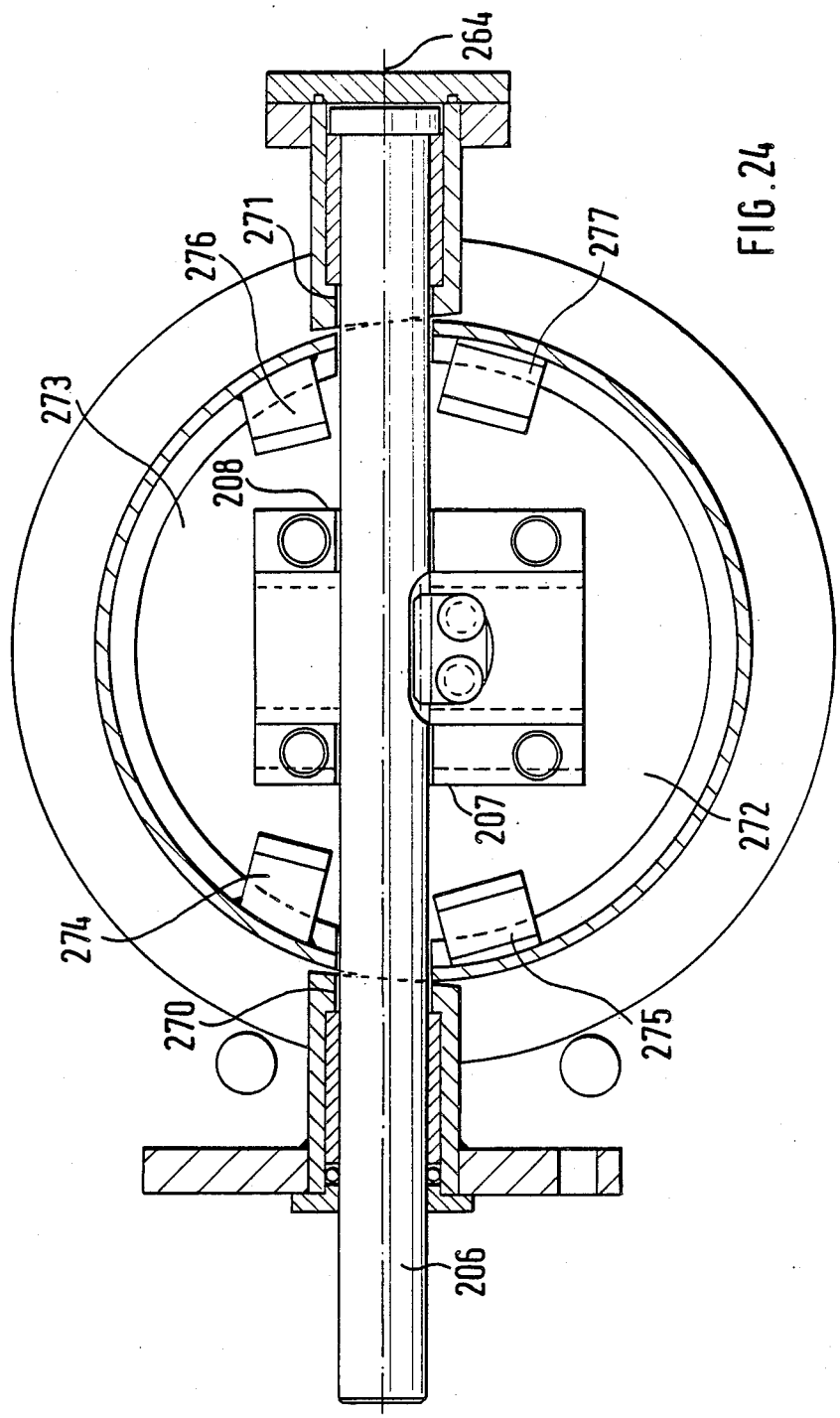
FIG. 24 is a view of the object of FIG. 23 corresponding to FIG. 21.

The embodiment according to FIGS. 23 and 24 initially differs from the embodiment according to FIGS. 20 to 22 with respect to the design of the guards on which the ring wheel is supported depending on the direction of load. According to the view in FIG. 24, the ring wheel (211) seated with the two movable bearings (207, 208) on the driving shaft (206) has one segment (272, 273) in each case, which however form one constructional unit. Each of these segments is located on one side of the center (264) of the shaft. Directly beside the axle recesses (270, 271) there are pairs of guards, i.e. the guards (274, 275) are located beside the axle recesses (270) and on each side of the driving shaft, and the guards (276, 277) are also located on each side of the driving shaft but directly beside the axle recesses (271). The guards (275 and 277) are mounted on the side (216) of the ring wheel (211) facing away from the valve flap (228) (FIG. 23) but are supported by projectures (266) beyond the rim (267) of the ring wheel on the guards (278) fixed on the housing. The guards (274 and 276), however, are mounted on the housing and support the back of the ring wheel (211) with projectures (279).

Compared with the embodiment according to FIGS. 20 to 22, in which the association of the guards with the driving shaft and with its housing recesses is the same, the embodiment according to FIGS. 23 and 24 involves the advantage that contamination, which might collect in the case of half-rings, is prevented from collecting in the housing. The guards also act in both directions of flow, which are indicated by the arrow (280). An axial guide in the embodiment according to FIGS. 20 to 22 is not shown in the embodiment according to FIGS. 23 and 24, but is also provided.

An embodiment of the inventive shut-off device in which a metal seat is used instead of a seal is not shown. Instead of the seal (230) there is then a roof-shaped edge which acts with its ridge on the surface of the valve flap seat (229). This drives off contamination and obtains a tight seat.

Figure 25:
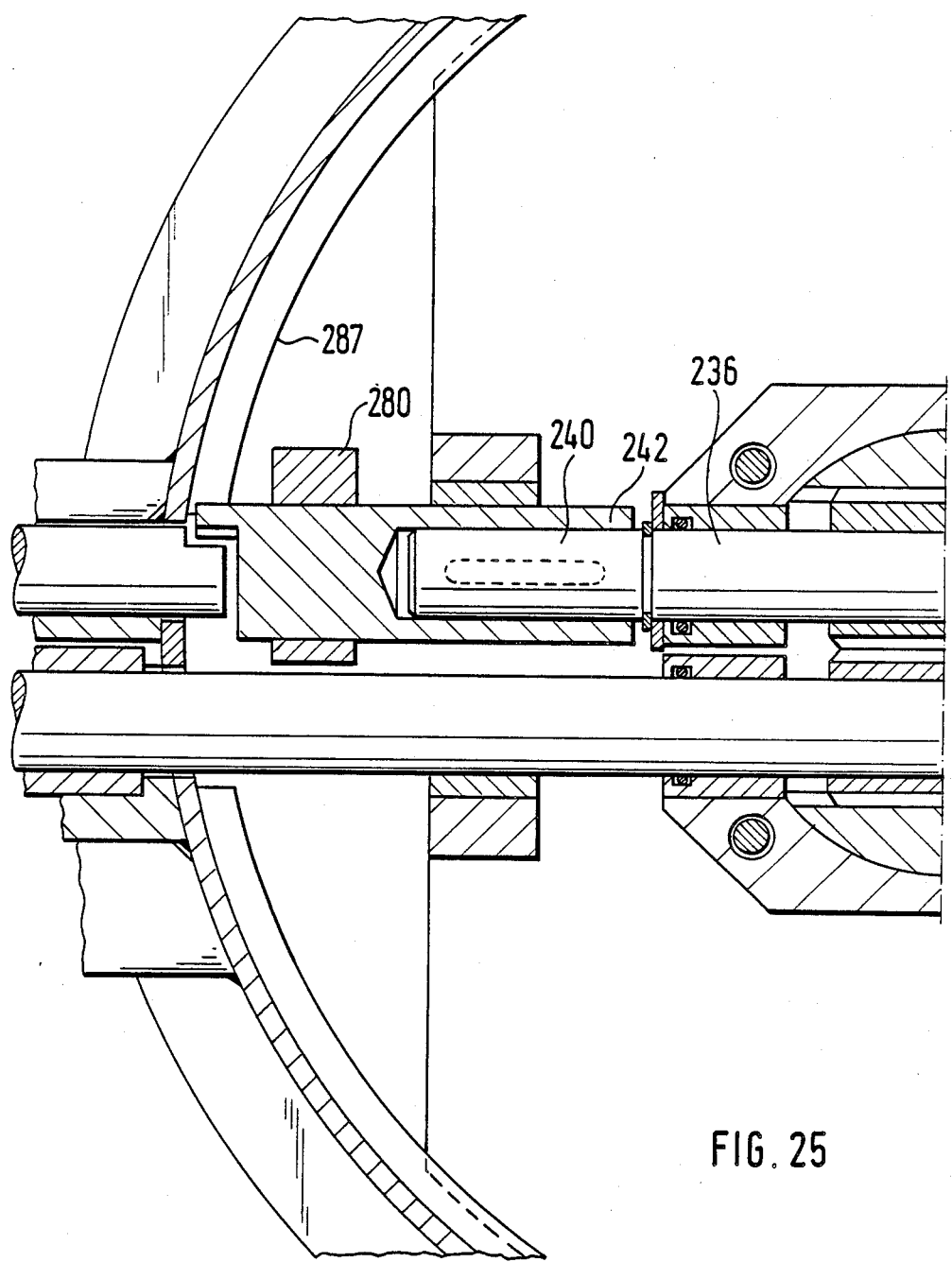
FIG. 25 is a front view in partial cross-section of a further embodiment of the inventive shut-off device.
Figure 26:
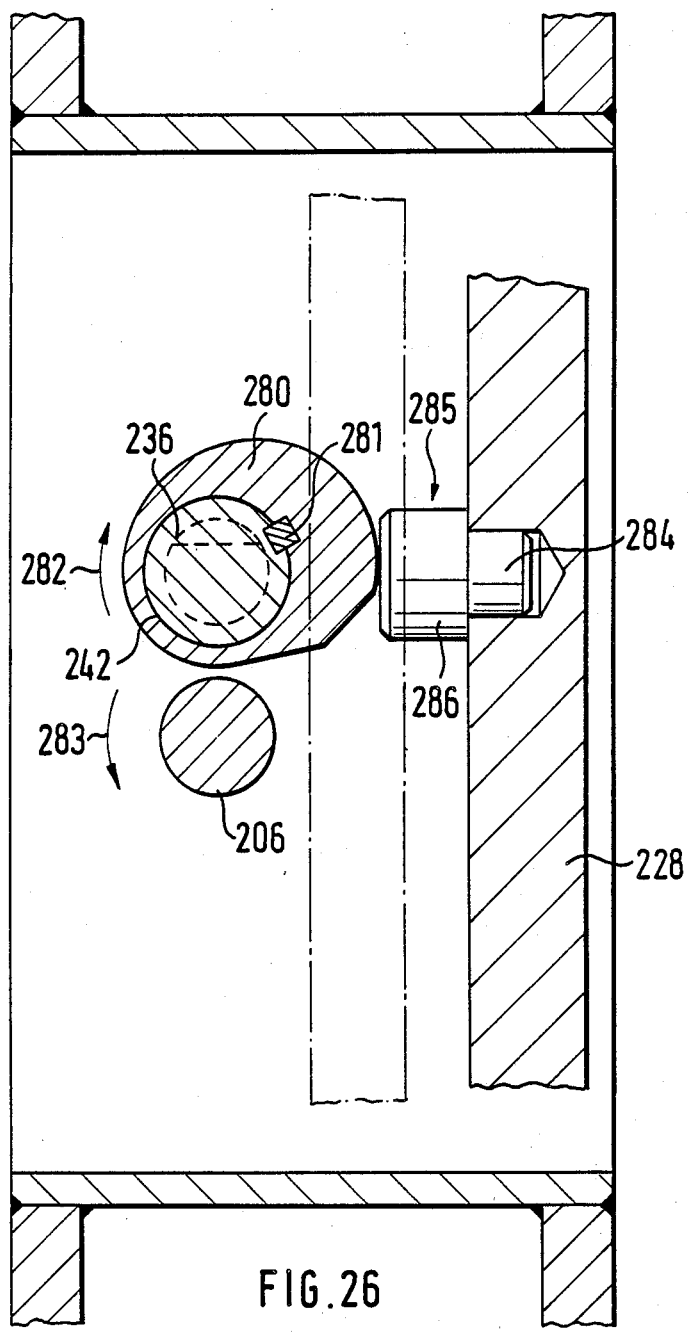
FIG. 26 a cut away longitudinal section of the object of FIG. 25.

In the embodiments according to FIGS. 25 and 26 a cam is seated on each shifting sleeve, of which only the shifting sleeve (242) is shown, the cam being shown at (280a) for the shifting sleeve (242) and the end (240) of the coupling axle (236) associated therewith. The cam (280a) is connected with the shifting sleeve (242) by a wedge (281) so as to rotate therewith. The second cam, which is not shown, is congruent to the cam (280a) and provided in the same way so that when the coupling axle (236) is rotated in the direction of the arrow (282) and the driving shaft (206) is rotated in the direction of the arrow (283), both cams drive the valve flap (228) via the guards (285) realized by screws (284) axially out of the pre-shutting position shown by dot-dash lines in FIG. 26 into the shutting position shown by unbroken lines, or open up the path for the valve flap (228) to be drawn back. The screw heads (286) are exactly adjusted beforehand so that the cams (280a) assume approximately equal forces and relieve the gear wholly or in part.

The cams are disposed directly beside the flap rim (287) as shown by the example of the cam (280a) in FIG. 25, so that there is a triple support of the flap on the back thereof, taking the gear into consideration.

An embodiment of the shut-off device is not shown in which the flap shaft meshes via its pinion with a double-toothed flap projection which meshes via its opposite toothing with a gearwheel mounted on the coupling shaft so as to rotate therewith, when the flap is to be pushed forward or drawn back.

I claim:
1. A shut-off device comprising:
 a tubular housing defining a fluid path therethrough, said housing having an annular valve seat transverse to said fluid path;
 a driving shaft rotatably disposed through said housing transverse to said fluid path;
 a ring wheel rotatable between a first position parallel to said fluid path and a second position transverse to said fluid path, said second position being adjacent to said valve seat;
 a stop means for preventing rotation of said ring wheel beyond said second position;
 movable bearings rotatably connecting said ring wheel to said driving shaft;
 a valve flap supported by said ring wheel and axially displaceable therefrom; and
 displacement means connecting said valve flap to said driving shaft, said displacement means being responsive to the rotation of said driving shaft in a first direction to first rotate said valve flap and said ring wheel from said first position to said second position upon further rotation of said driving shaft said displacement means will axially displace said valve flap from said ring wheel onto said valve seat when said ring wheel engages said stop means, said displacement means being responsive to the rotation of said driving shaft in a reverse direction to first axially displace said valve flap from said said valve seat and into engagement with said ring wheel and upon further rotation of said driving shaft said valve flap and said ring wheel are rotated from said second position to said first position.

2. The shut-off device according to claim 40, characterized in that said ring wheel has in the center an opening which receives therethrough a rearward flap projection of said valve flap which serves as a drive of said displacement means.

3. The shut-off device according to claim 2, characterized in that said flap projection of said valve flap is coupled with a radial driver of said driving shaft.

4. The shut-off device according to claim 3, characterized in that said ring wheel has a rearward guide flange for guiding said valve flap, the width of said guide flange exceeding the axial displacement of said valve flap.

5. The shut-off device according to claim 3, characterized in that said radial driver is a pinion and said flap projection is a toothed rack.

6. The shut-off device according to claim 3, characterized in that said radial driver is a lever having a peg which is engaged in a transverse slot provided in said flap projection.

7. The shut-off device according to claim 3, characterized in that said radial driver is a fork which engages a peg provided on said flap projection.

8. The shut-off device according to claim 3, characterized in that said radial driver is an eccentric cam which engages a receiving hollow provided in said flap projection.

9. The shut-off device according to claim 3, characterized in that said flap projection is a gearbox having a cover, said radial driver is a cam disposed on said driving shaft so as to rotate therewith, said cam being disposed in said gearbox and engaging the back of said valve flap and in that said cam has two cam lobes staggered by 180° which follow the eccentric curves ascending in opposite directions, one of said cam lobes constantly engaging said valve flap and the other cam lobe constantly engaging said cover, while the opening rotational movement of said cam is limited by a guard disposed in said gearbox.

10. The shut-off device according to claim 9, characterized in that said valve flap and said ring wheel are biased away from each other by a spreading spring.

11. The shut-off device according to claim 10, characterized in that said spreading spring is a disk spring disposed between said valve flap and said ring wheel.

12. The shut-off device according to claim 10, characterized in that a guard attached to said housing has a locking means for said ring wheel.

13. The shut-off device according to claim 12, characterized in that the unlocking resistance of said locking means is higher than its locking resistance.

14. The shut-off device according to claim 1, characterized in that said ring wheel and said valve flap are held together by a plurality of pull-back springs.

15. The shut-off device according to claim 1, characterized in that said driving shaft is rotatable via a self-locking worm gear.

16. The shut-off device according to claim 5, characterized in that said flap projection is connected to a valve disk of an auxiliary valve, said auxiliary valve having a closing member connected to said valve disk which is limitedly displaceable in a central opening in said valve flap, and in that said valve flap has one or more channels passing therethrough whose rearward channel openings are covered by said valve disk which can be displaced with said valve flap by said driving shaft.

17. The shut-off device according to claim 16, characterized in that said closing member has at its front end a pull-back spring biasing said valve disk over said rearward channel openings.

18. The shut-off device according to claim 17, characterized in that said pull-back spring is a disk spring assembly clamped between said valve flap and an abutment plate attached to said closing member.

19. The shut-off device according to claim 18, characterized in that said channels are disposed through said valve flap about a ring which concentrically surrounds said central opening, and in that said channels converge toward each other at their rearward end.

20. The shut-off device according to claim 16, characterized in that the toothing of said toothed rack is aligned with the central axis of said closing member.

21. The shut-off device according to claim 16, characterized in that said valve disk is partly received in an enlarged bore in said valve flap and underlaid with a sealing disk which covers the area of said channel openings.

22. The shut-off device according to claim 21, characterized in that said central opening is lined with a guide sleeve for said closing member.

23. The shut-off device according to claim 22, characterized in that said stop means includes a guard attached to the interior of said tubular housing to limit the rotation of said ring wheel, said guard being adjustable in the axial direction of said tubular housing.

24. The shut-off device according to claim 1, characterized in that one of said valve flap and said ring wheel is loaded by an energy accumulator acting in the direction in which they rotationally bias said valve flap and said ring wheel into a pre-shutting position.

25. The shut-off device according to claim 24, characterized in that a spring clamped between said cam and one of said valve flap serves as said energy accumulator.

26. The shut-off device according to claim 24, characterized in that a weight disposed eccentrically on one of said valve flap and said ring wheel serves as said energy accumulator.

27. The shut-off device according to claim 14, characterized in that a spring clamped between said cam and said ring wheel serves as said energy accumulator.

28. The shut-off device according to claim 1, characterized in that said housing has at least one pair of guards attached thereto which support at least one segment of said ring wheel beside a pair of shaft recesses in the tubular housing in a pre-shutting position.

29. The shut-off device according to claim 28, characterized in that two pairs of guards are provided for said ring wheel one pair of guards being provided on each side of said pair of shaft recesses in said housing.

30. The shut-off device according to claim 28, characterized in that each guard of said pair of guards is a half-ring fixed on said housing.

31. The shut-off device according to claim 1, characterized in that an axial guide having a first portion fixed on said housing, and a second portion fixed on said valve flap, serves as said displacement means, the driving shaft serving to position said valve flap in said axial guide and a pushing member rotatably connected to said driving shaft serving to displace said valve flap axially in both directions.

32. The shut-off device according to claim 31, characterized in that said first portion of said axial guide comprises sliding tracks fixed on the housing and located opposite each other and said second portion comprises movable sliding blocks which are provided on said valve flap.

33. The shut-off device according to claim 32, characterized in that said sliding tracks are flattened areas on bolts which protrude into said housing, and said sliding blocks are formed on L-shaped recesses provided on said pushing member.

34. The shut-off device according to claim 33, characterized in that said pushing member comprises a coupling axle, said coupling axle having at its center a shifting pinion engaging a driver pinion attached to said driving shaft, said coupling axle having a shifting sleeve provided at each end, each of said shifting sleeves having said L-shaped recesses provided at the ends thereof, said shifting sleeves being rotatably supported from said driving shaft by a pair of movable bearings.

35. The shut-off device according to claim 34, characterized in that said valve flap has a seat ring with a roof-shaped profile which cooperates with a valve seat in said housing.

36. The shut-off device according to claim 34, characterized in that congruent and evenly bearing cams connected with said coupling axle so as to rotate therewith are provided in the immediate vicinity of the rim of said valve flap and act on adjustable flap guards.

37. The shut-off device according to claim 36, characterized in that a cam is provided for both ends of said coupling axle and said adjustable flap guards are heads of screws which are screwed into said valve flap on the drive side.

38. The shut-off device according to claim 37, characterized in that said cams are provided on said shifting sleeves attached to the ends of said coupling axle.

39. The shut-off device according to claim 38, characterized in that said coupling axle meshes via said radial driver and shifting pinions with a flap projection which is toothed on both sides and meshes via its opposite toothing with a gearwheel mounted on the coupling axle so as to rotate therewith.

* * * * *

UNITED STATES PATENT AND TRADEMARK OFFICE
CERTIFICATE OF CORRECTION

PATENT NO. : 4,770,392
DATED : September 13, 1988
INVENTOR(S) : Fritz Schmidt

It is certified that error appears in the above-identified patent and that said Letters Patent is hereby corrected as shown below:

Column 1, line 34, delete "shutoff" and insert ---- shut-off ----.

Column 8, line 48, delete "value" and insert ---- valve ----.

Column 11, line 30, delete "and" and insert ---- to ----.

Column 14, line 40, delete "bolt".

Column 14, line 60, delete "bearing" and insert ---- shifting ----.

In the Claims

Column 16, line 48, delete "40" and insert ---- 1 -----.

Signed and Sealed this

Ninth Day of May, 1989

*Attest:*

DONALD J. QUIGG

*Attesting Officer*     Commissioner of Patents and Trademarks